US000001492H

United States Statutory Invention Registration [19]

[11] Reg. Number: H1492

Park et al.

[45] Published: Oct. 3, 1995

[54] HYBRID COUPLER FOR MILLIMETER WAVE AMPLIFIER

[75] Inventors: Gun-Sik Park, Potomac, Md.; Carter M. Armstrong, Kildeer, Ill.; Russel H. Kyser, Suitland, Md.; Jay L. Hirschfield, Hamden, Conn.

[73] Assignee: United States of America, Washington, D.C.

[21] Appl. No.: 379,840

[22] Filed: Jan. 27, 1995

[51] Int. Cl.[6] ..... H01P 1/16

[52] U.S. Cl. ..... 333/21 R; 333/24 R

*Primary Examiner*—Bernarr E. Gregory

*Attorney, Agent, or Firm*—Thomas E. McDonnell; Charles J. Stockstill

[57] ABSTRACT

A hybrid coupler for a millimeter wave amplifier is disclosed. The coupler includes a cylindrical waveguide surrounded by a ring waveguide having a common wall formed with symmetrically disposed holes. A $TE_{1,0}$ input is provided by an H-plane teed linear waveguide. A nonlinear transition waveguide from the cylindrical waveguide to a slotted guide mode converts the signal coupled between the ring and cylindrical waveguides to a slotted $TE_{3,1}$ mode. The ring and cylindrical waveguides may be concentric or non-concentric and the holes may be square.

12 Claims, 7 Drawing Sheets

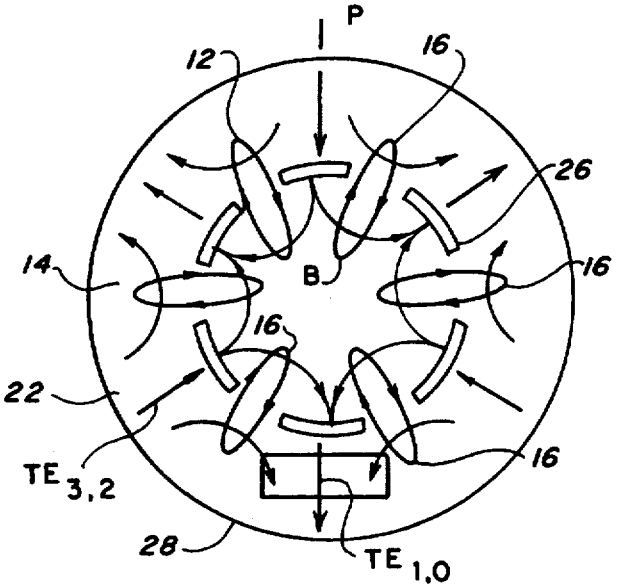
FIG. 3
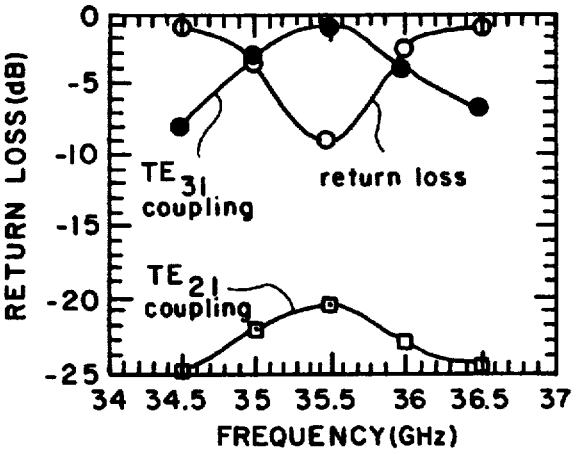
FIG. 4
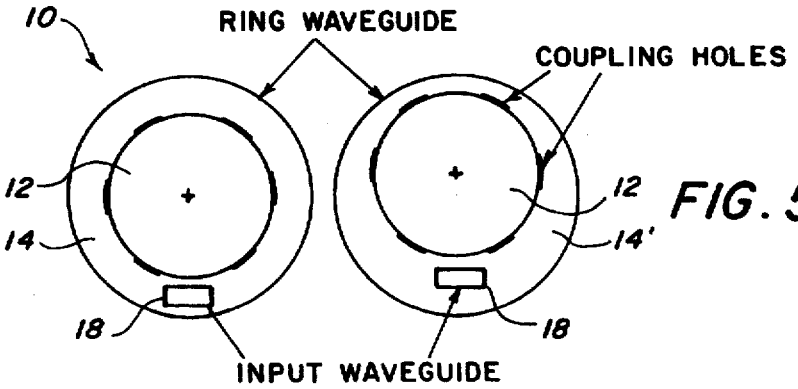
FIG. 5A
FIG. 5B

HYBRID COUPLER FOR MILLIMETER WAVE AMPLIFIER

BACKGROUND OF THE INVENTION

1. Field of the Invention

The invention relates to millimeter wave amplifiers and particularly to a hybrid coupler for launching a $TE_{3,1}$ mode wave into a slotted waveguide interaction structure with good coupling strength, bandwidth, mode purity and stability.

2. Description of Related Art

Recent interest in high resolution radar has generated the need for the development of compact efficient high power millimeter wave amplifiers. The power levels of interest are generally beyond that possible from conventional slow wave vacuum electronic technology. Thus, the development of advanced fast wave gyro-amplifiers is of interest. However, the magnetic field requirement for gyro-amplifiers operating at the fundamental cyclotron frequency is too high at millimeter wave frequencies, e.g., 3.5 T @95 GHz, to make them practical for many system applications. For maximum system utility, therefore, the development of harmonic gyro-amplifiers with much lower magnetic fields is required. Gyro-devices employing a slotted waveguide interaction structure with an axis encircling electron beam have the potential for efficient high power harmonic operation at reduced values of the magnetic field and beam voltage. An experimental arrangement for demonstrating the efficient operation (>35%) of a second harmonic 100 KW gyro-peniotron amplifier employs a circuit having a six vaned slotted waveguide structure operating in Ka-band in the $TE_{3,1}$ mode at 70 kV. A critical component for this amplifier and for slotted waveguide devices in general is the coupler. The design of a high order mode coupler requires consideration of coupling strength, bandwidth, mode purity, and beam and circuit stability.

In a gyro-amplifier, a high power electron beam interacts with a low power millimeter wave signal. The electron beam gives up energy to the signal thereby boosting its power. The degree of power transfer is a measure of the coupling efficiency of the device. Bandwidth is a measure of coupling efficiency over a range of frequencies around a center frequency of interest. Mode purity is a measure of the strength of the desired mode coupled in the circuit to undesired modes which reduce the strength of the coupled signal and are thus considered noise. Beam and circuit stability are measures of signal fluctuations and signal loss.

The modes of the signal may be characterized or visualized as the number of different directions in which a field associated with the signal may experience a maximum value. For example, in a rectangular waveguide in the $TE_{1,0}$ represents a transverse electric field which supports a unidirectional electrical field vector transverse to the direction of wave propagation. The signal has a maximum value at lobes separated by 180°. A signal having a $TE_{3,1}$ mode has a maximum along three axes separated by 60° at six lobes. The mode is thus easily described as having half the number of lobes.

In a gyro-amplifier, an elongated cylindrical waveguide having, for example, a central channel and six evenly spaced radial slots forms a cavity in which an axial electron beam interacts with a $TE_{3,1}$ signal which occupies the slots. If the waveguide is properly sized for the center frequency of interest, the beam and the signal more efficiently interact thereby resulting in good amplification.

Descriptions of couplers for slotted waveguide interaction structures are not abundant in the literature. A related coupler for smooth guide was presented by UCLA for a high harmonic amplifier experiment at 16.2 GHz operating in the $TE_{8,1}$ mode (D. S. Furuno, D. B. McDermott, C. S. Kou, N. C. Luhmann, Jr., P. Vitello, IEEE Transaction on Plasma Science, 18, 313–320, 1990.) An azimuthal phase velocity coupler (APVC) was described. To launch the desired $TE_{8,1}$ mode in to the cylindrical waveguide in the coupler, a rectangular waveguide was wrapped around a large diameter cylindrical waveguide having small round holes located azimuthally for coupling into the desired $TE_{8,1}$ mode for cylindrical waveguide. One end of the rectangular wrapped waveguide was shorted to form a standing wave whose guide wavelength corresponded to twice the length between two adjacent holes in the walls of the cylindrical waveguide. In the described arrangement, $TE_{1,0}$ mode formed in the wrapped waveguide electrically coupled into the inner cylinder through the holes. A return loss of −8 dB was reported. However, the coupler launched a circularly polarized mode which was not suitable for a slotted waveguide circuit.

SUMMARY OF THE INVENTION

It is an object of the invention to efficiently launch a $TE_{n-1}$ mode signal into a slotted wave guide.

It is another object of the invention to mode convert a linearly polarized $TE_{3,1}$ wave in a cylindrical waveguide to a slotted waveguide.

It is yet another object of the invention to provide a hybrid smooth-guide linearly polarized coupler.

It is another object of the invention to provide a mode coupler for a millimeter wave amplifier, said coupler being based on a hybrid structure to produce a linearly polarized $TE_{3,1}$ mode in a cylindrical smooth wall waveguide.

It is another object of the invention to provide two step coupling to thereby increase the bandwidth.

The invention is based upon the discovery that two-step coupling may be employed to efficiently launch a $TE_{n,1}$ mode signal, where n=0, 1, 3, 5 . . . , into a slotted waveguide. A linearly polarized $TE_{3,1}$ wave is coupled to a smooth-wall cylindrical waveguide and is mode converted in a transition waveguide to a slotted waveguide. A rectangular waveguide carrying the $TE_{1,0}$ wave is coupled to a ring waveguide in an H-plane tee and the $TE_{1,0}$ signal is coupled to the cylindrical wave through a plurality of relatively large apertures formed in a common wall between the ring and cylindrical waveguides.

In a particular embodiment, the invention is directed to a coupler for a slotted waveguide interactive structure comprising a hybrid smooth-guide linearly polarized $TE_{3,1}$ coupler. The coupler includes a smooth-guide cylinder having a plurality of coupling holes formed therein and a ring waveguide surrounding the cylinder. A linear tapered rectangular transition waveguide carrying a $TE_{1,0}$ wave is H-plane teed to the ring waveguide. A nonlinearly tapered transition waveguide having a smooth-guide end is coupled to the smooth-guide cylinder, and a reduced diameter slotted guide provides for mode conversion from the cylindrical mode to the slotted mode.

In an exemplary embodiment, a millimeter wave amplifier operating at harmonics of the electron cyclotron frequency utilizing a slotted waveguide structure requires a $TE_{n,1}$ mode coupler. A 35 Ghz coupler, based on a hybrid structure according to the invention produces a linearly polarized $TE_{3,1}$ mode in a cylindrical smooth-wall waveguide. A nonlinearly tapered transition waveguide from the cylindrical waveguide to a slotted waveguide, has a return loss of −20 dB. X-band versions of the coupler and transition have been operated at cold test. Measurements on the coupler indicate a return loss of −9 dB and 3% bandwidth. This is in good agreement with the known HP HFSS code. According to a design model study, the bandwidth can be extended to more than 10% by tapering the waveguide structure and using square coupling holes. Use of an impedance matching post improves the return loss better than −25 dB at the band center. A back-to-back coupling test at X-band confirms better than 1 dB coupling at the center frequency, likewise in good agreement with the HFSS code. The field pattern of $TE_{3,1}$ has been verified by RF probe measurements on the X-band model. The linear polarization of the launched $TE_{3,1}$ mode also has been confirmed.

The approach of the present invention to launch a $TE_{n,1}$ mode into a slotted waveguide employs a two-step coupling. The $TE_{3,1}$ wave is coupled into a smooth-wall cylindrical waveguide and the wave is mode converted from a $TE_{3,1}$ mode in a cylindrical waveguide to $TE_{3,1}$ mode (or $\pi$ mode) in a slotted waveguide by a transition waveguide. A linearly polarized wave is required because the slotted waveguide is not azimuthally symmetric. An incoming wave from the coupler into the slotted waveguide will be strongly reflected back, since the field pattern of the circularly polarized wave is not supported by the slotted waveguide.

Launching a $TE_{3,1}$ mode directly into a slotted waveguide interaction structure limits the size of the coupling hole that can be used and thus the coupling bandwidth and strength. To avoid these disadvantages, a hybrid structure has been provided for good coupling to a linear polarized mode over a wide bandwidth (~10%).

BRIEF DESCRIPTION OF THE DRAWINGS

FIG. 3 is a schematic illustration in cross-section of the interactive region between the ring waveguide and the cylindrical waveguide;

FIG. 4 is a plot of return loss versus frequency;

FIGS. 5A and 5B are schematic cross-sectional illustrations of the concentric and offset ring waveguides according to the present invention;

DESCRIPTION OF THE INVENTION

Figure 1:
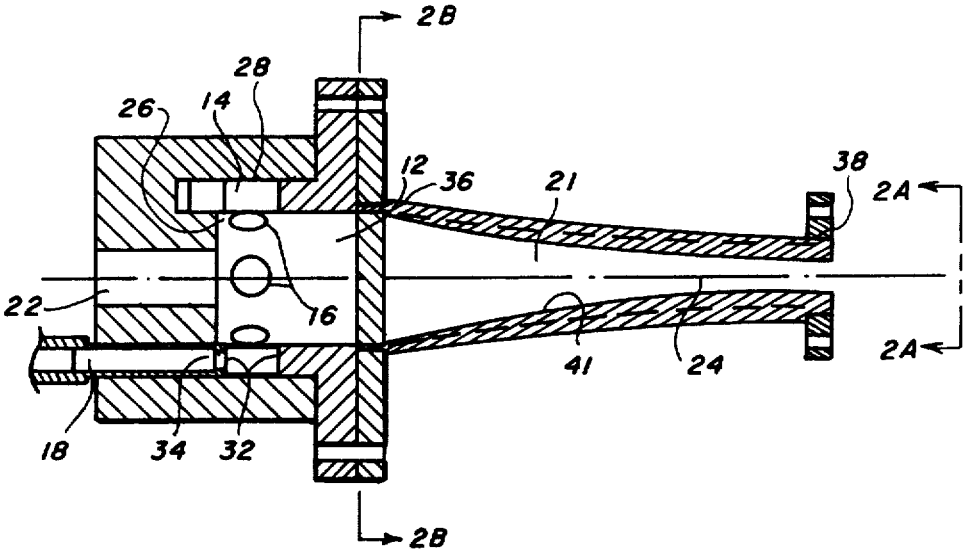
FIG. 1 is a cross-section of a hybrid coupler according to the present invention.

According to the invention, as shown in FIGS. 1–3, a slotted waveguide interaction structure employs a hybrid smooth guide linear polarized $TE_{3,1}$ coupler 10, including a smooth-guide cylinder 12 and a concentric or off-center ring-waveguide 14 with six large circular or square sidewall coupling holes 16; a linear tapered rectangular transition waveguide 18 which is H-plane teed to the ring-waveguide 14; and a nonlinearaly tapered transition waveguide or mode converter 21 for mode conversion from the cylindrical $TE_{3,1}$ mode to the slotted $TE_{3,1}$ mode or ($\pi$ mode). The coupler 10 also includes an electron beam inlet 22 which is concentric with the cylindrical waveguide 12.

The coupler 10 according to the invention has a central axis 24 which is concentric with the cylindrical waveguide 12, the mode converter 21 and the electron beam inlet 22. The ring waveguide 14 may be concentric with the axis 14 or, as hereinafter described, the ring waveguide 14 may be formed off center with respect to the axis 24.

The ring waveguide 14 has an inner wall portion 26 which is common with a portion of the cylindrical waveguide 12. The holes 16 are formed in the common wall portion 26, as shown. The ring waveguide 14 further includes an outer wall portion 28 which is spaced from the inner wall 26 and may be concentric with or off center with the central axis 24 thereby providing a concentric ring waveguide 14. The inner and outer walls 26 and 28 of the ring waveguide 14 are joined by spaced apart narrow wall portions 32. The linear tapered rectangular transition waveguide 18 is coupled to the ring waveguide 14 by means of a rectangular aperture 34 formed in the narrow wall 32 in the so-called H-plane of the waveguide 18.

The mode converter 21 is a slotted waveguide which is gradually tapered from a smooth wall cylindrical transition 36 to a radially slotted transition 38. Interior walls 41 of the converter 21 are gradually tapered between the cylindrical transition 36 and the slotted transition 38. In an exemplary embodiment, the interior walls 41 of the mode converter 21 have a nonlinear contour the shape of which may be generated using a calculated field for a slotted structure.

Figure 2A:
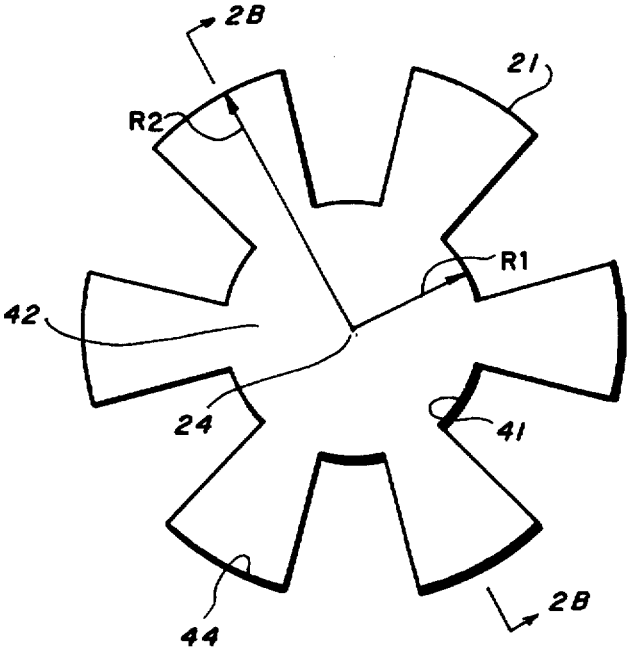
FIG. 2A is an end view of the mode converter taken along line 2A—2A of FIG. 1.

FIG. 2A is an end view of the converter 21 showing a central opening 42 and a plurality of radial slots 44. The central opening 42 has an inner radius $R_i$ and the slots 44 have an outer radius $R_o$.

Figure 2B:
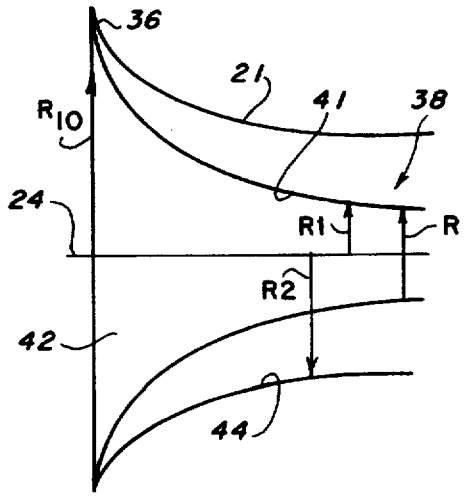
FIG. 2B is an end view of the mode converter taken along line 2B—2B of FIG. 2A.

FIG. 2B illustrates in a side sectional view the contour of the inner walls 41 of the mode converter 21 between the cylindrical transition 36 and the slotted transition 38.

In a particular embodiment of the invention, as shown in FIG. 1, the $TE_{3,1}$ mode is launched on the smooth-wall cylindrical waveguide transition 36 at a radius $R_{in}$ (0.235") which is about twice the radius $R_o$ (0.118") of the slotted waveguide transition 38. In the exemplary embodiment, the radius $R_{in}$ is preferably less than about 0.24". $TE_{3,1}$ mode formed in the smooth-wall cylindrical waveguide 12 propagates through the mode converter 21 into the slotted waveguide transition 38 to a slotted waveguide (not shown) forming a $TE_{3,1}$ mode (or $\pi$ mode). The return loss of the converter 21 has been minimized to be –20 dB for a circuit of 1.7" long.

The large coupling holes 16 between the cylinder 12 and ring-waveguide 14 create a hybrid waveguide structure which strongly supports a $TE_{3,2}$ mode inside the structure combining the smooth-wall cylinder waveguide 12 and the ring waveguide 14 as shown in FIG. 3. In other words, in the ring waveguide 14 a coaxial $TE_{3,1}$ mode is formed which magnetically couples via magnetic field B into the smooth-wall cylinder $TE_{3,1}$ mode through the holes 16. In the exemplary embodiment, the magnetic field B associated with the coupler is in a range of about 0.632 and 0.663T and preferably about 0.65T. For good coupling to the slotted waveguide, the coupled wave must be linearly polarized, i.e., non-rotating. In practice, the linearly polarized wave can be realized by means of the H-plane teed rectangular waveguide 18 in the narrow-wall 32 of the ring-waveguide 14. As shown in FIG. 3, when a $TE_{1,0}$ mode is incident through linear tapered rectangular waveguide 18 into the narrow-wall 32 of the ring-waveguide 14. The electric field has even symmetry about the midplane P and a linearly polarized wave is forced.

In order to achieve better coupling and reduced return loss, unequal sized coupling holes 16 may be used. The coupling holes 16 may be centered on the sidewall 26 and arranged symmetrically (e.g., 60° apart) in pairs with increasing diameter moving away from the H-plane input tee 19. For example, in the Ka-band coupler, the radii of the holes 16 may be 0.055", 0.060" and 0.065" increasing with distance from the waveguide 18.

Using the known 3-D electromagnetic code, HFSS, –0.7 dB coupling to the $TE_{3,1}$ mode with a linear polarization, –20 dB to the $TE_{2,1}$ mode, and –9 dB return loss are predicted for the Ka-band coupler, as shown in the FIG. 4. In the example, the coupling hole thickness was chosen to be 0.010".

Figure 6:
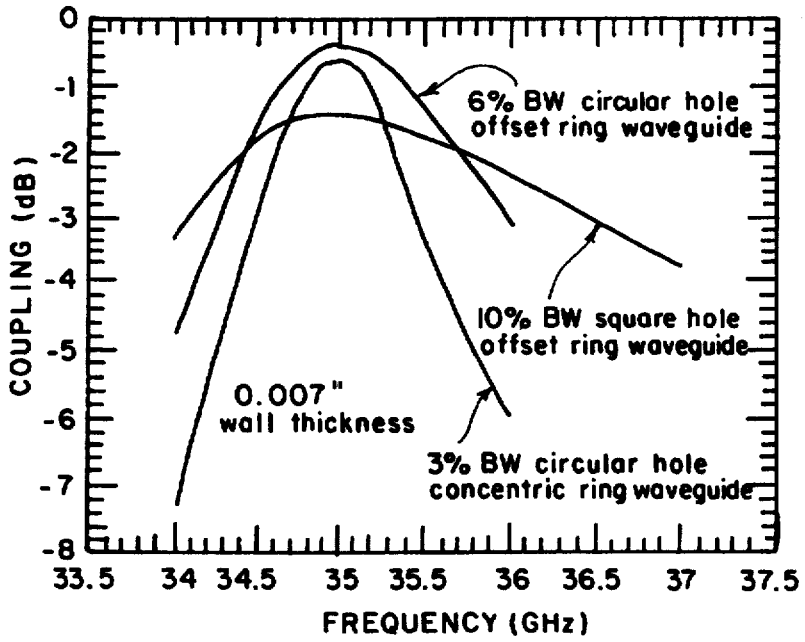
FIG. 6 is a plot illustrating coupling in dB versus frequency in Ghz for various waveguides having various waveguide and hole configurations according to the present invention.
Figure 7:
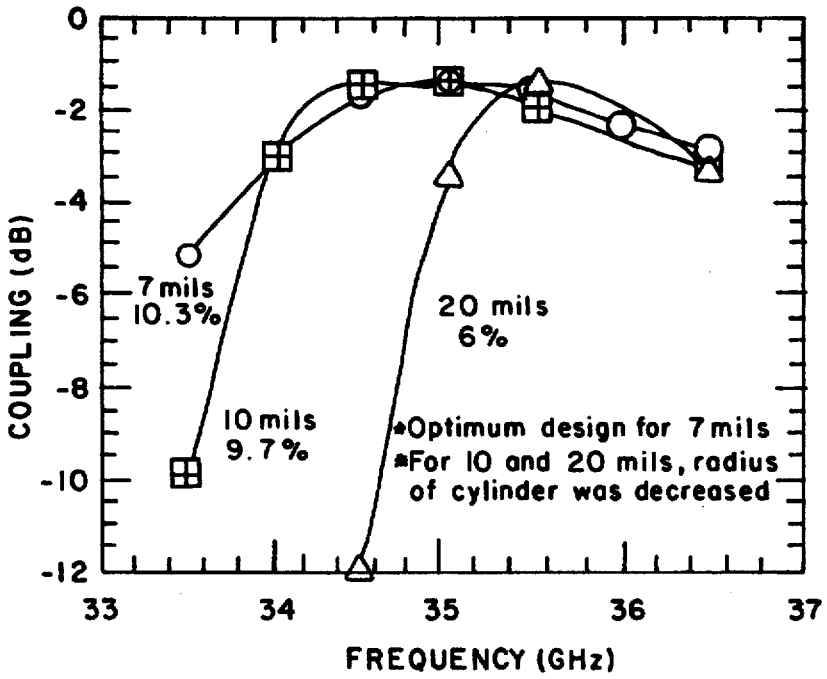
FIG. 7 is a plot of coupling versus frequency for various waveguide arrangements having different wall thicknesses between the ring and the cylindrical waveguide.
Figure 8:
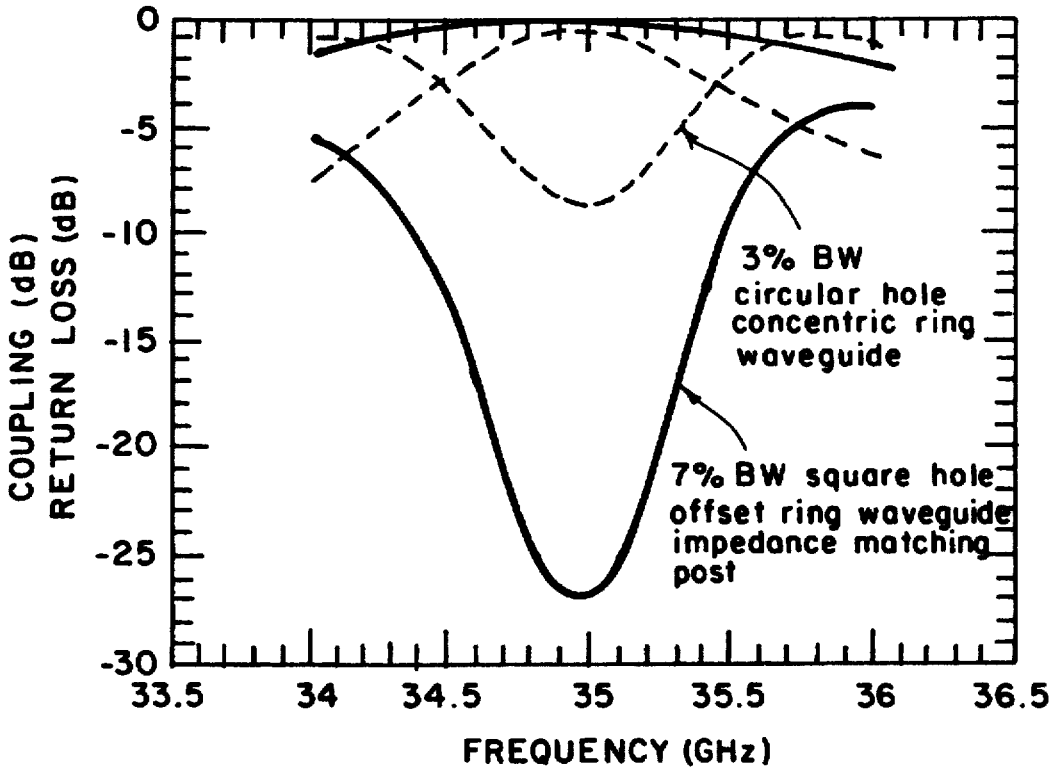
FIG. 8 is plot of coupling and return loss versus frequency for various concentric and offset waveguide arrangements according to the invention.
Figures 9A, 9B:
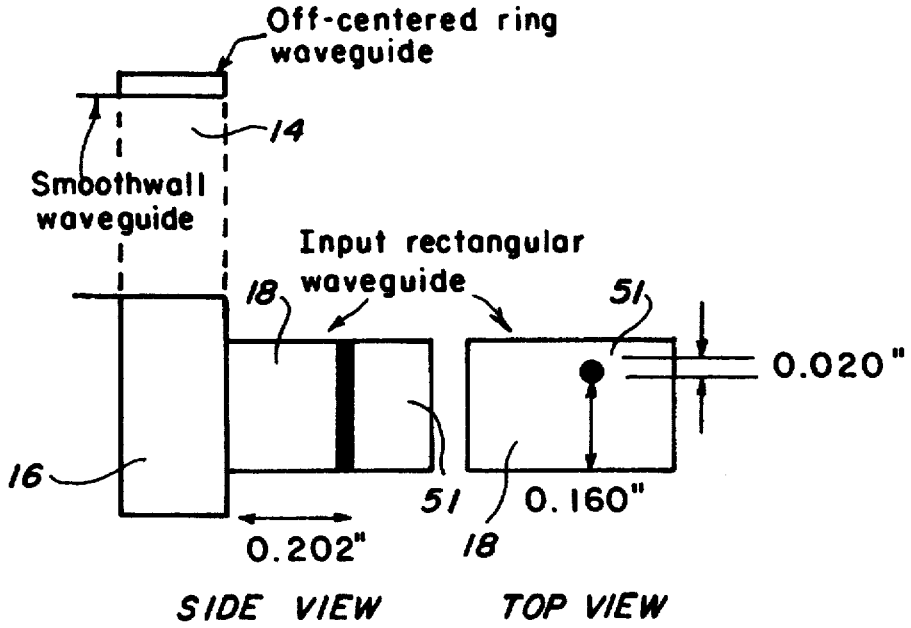
FIGS. 9A and 9B are respective side-sectional and end schematic views of the coupler according to the present invention illustrating a shorting post or termination.

The bandwidth of the coupler 10 (shown in the cross-section of FIG. 5A) may be doubled (3% to 6%) by offsetting the ring waveguide 14 with respect to smooth-wall cylinder 16. As shown in FIG. 5B, the guide wavelength along the offset ring waveguide 14' varies so that wider bandwidth can be achieved. Also, the bandwidth may be doubled (6% to 10%), as shown in the plot of FIG. 6, coupling (dB) V frequency (GH), by using square holes instead of the circular holes 16 shown in FIG. 1. The wall thickness of the common wall 26 for coupling holes 16 used in the arrangement exemplified in FIG. 6 is set at 0.007". A thicker common wall 26 results in smaller bandwidth as shown in FIG. 7. Return loss and bandwidth plotted in FIG. 8 can be improved by means of an impedance matching post 51 located in the rectangular wave guide 18 schematically shown in FIGS. 9A and 9B.

Figure 10:
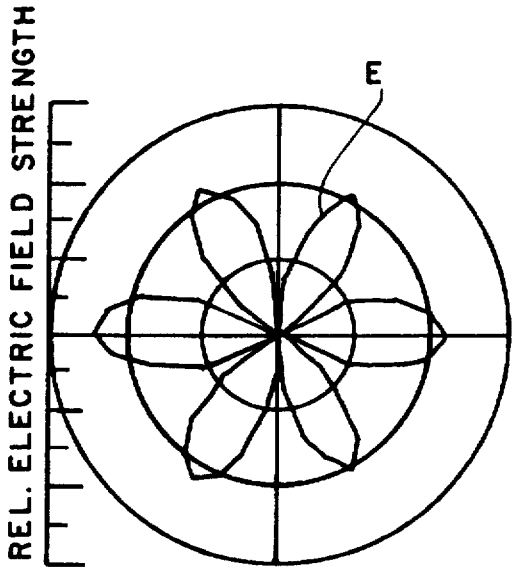
FIG. 10 is an illustration of the electric field strength coupling measured in the coupler according to the present invention.

An exemplary x-band smooth guide coupler (3% of bandwidth and 0.010" wall thickness), was fabricated for cold test. Preliminary cold test measurements, shown in FIG. 10, illustrate that the electric field pattern E measured in the cylindrical guide using an RF probe agrees with that expected for a linearly polarized $TE_{3,1}$ mode.

Figure 11:
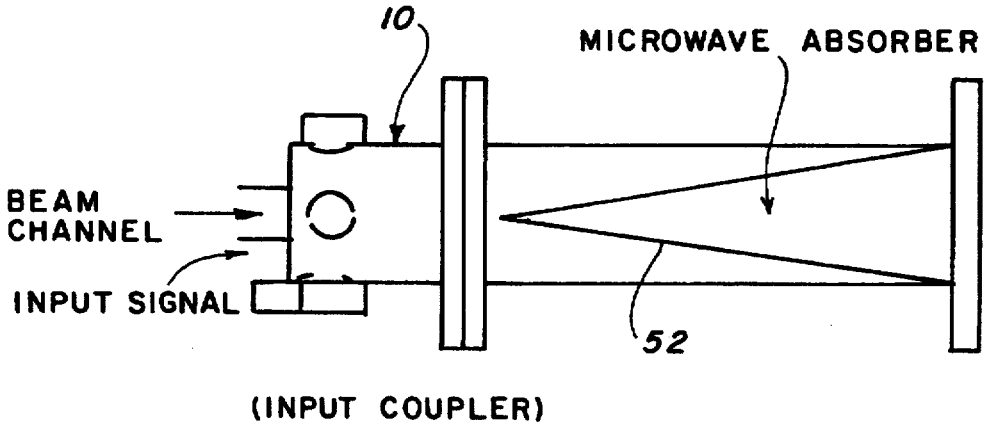
FIG. 11 is a schematic side illustration of a coupler according to the present invention terminated with an absorber.
Figure 12:
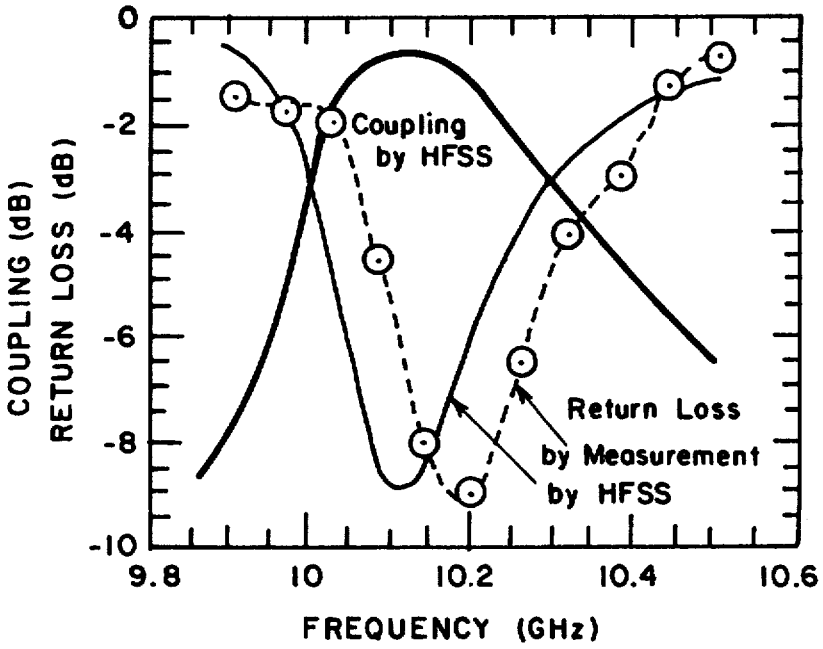
FIG. 12 is a plot of coupling and return loss for the arrangement illustrated in FIG. 11.

The return loss for the smooth guide coupler 10 was measured by terminating the cylindrical waveguide section 12 with a cone-shaped microwave absorber 52, illustrated in FIG. 11. As shown in FIG. 12, the return loss measurements, illustrated in dotted line, of 3% bandwidth and –9 dB minimum return loss agree well with the HFSS predictions illustrated in solid line. The curves measured return loss to HFSS predictions are offset by only about 100 MHz offset. One possible source of the 100 Mhz shift in frequency for maximum coupling may be attributed to fabrication errors in the cold test structures.

Figure 13:
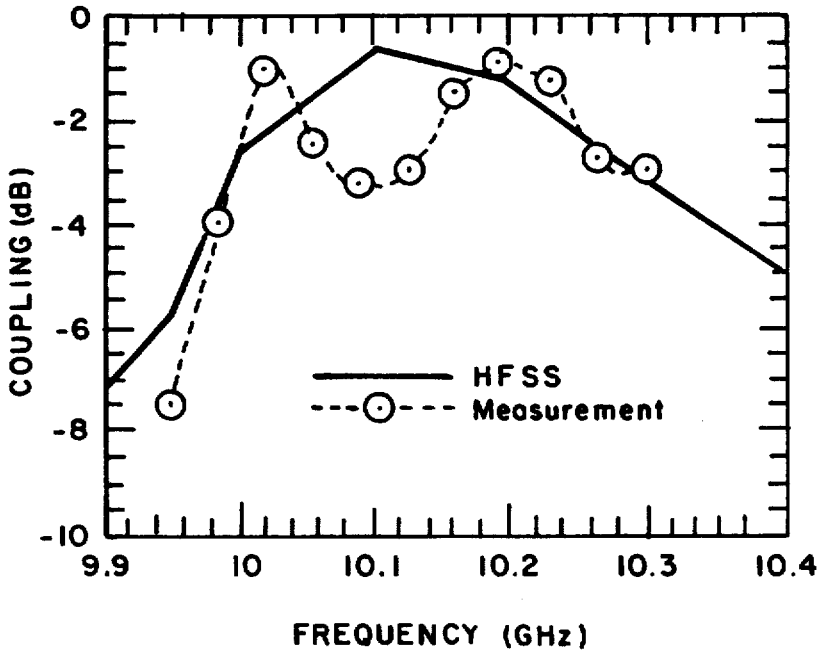
FIG. 13 is a plot of coupling versus frequency for a measured and ideal coupler.

A Ka-band coupler was built and the measured return loss is shown as a dotted line in FIG. 13. The result is in good agreement with the HFSS prediction shown in solid line. However, the multi-path reflection of waves similar to that in a cavity generated a dip in the middle of the band as shown.

Figure 14:
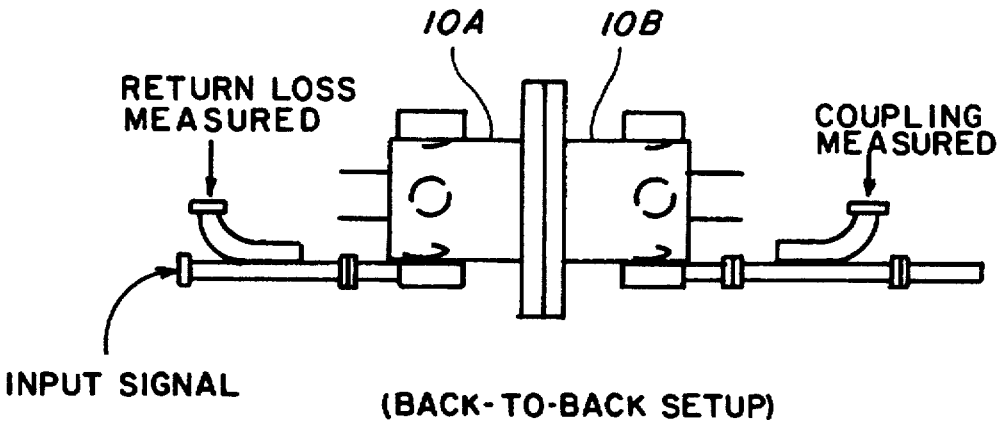
FIG. 14 is an illustration of an arrangement for measuring return loss and coupling utilizing back-to-back couplers according to the present invention.
Figure 15:
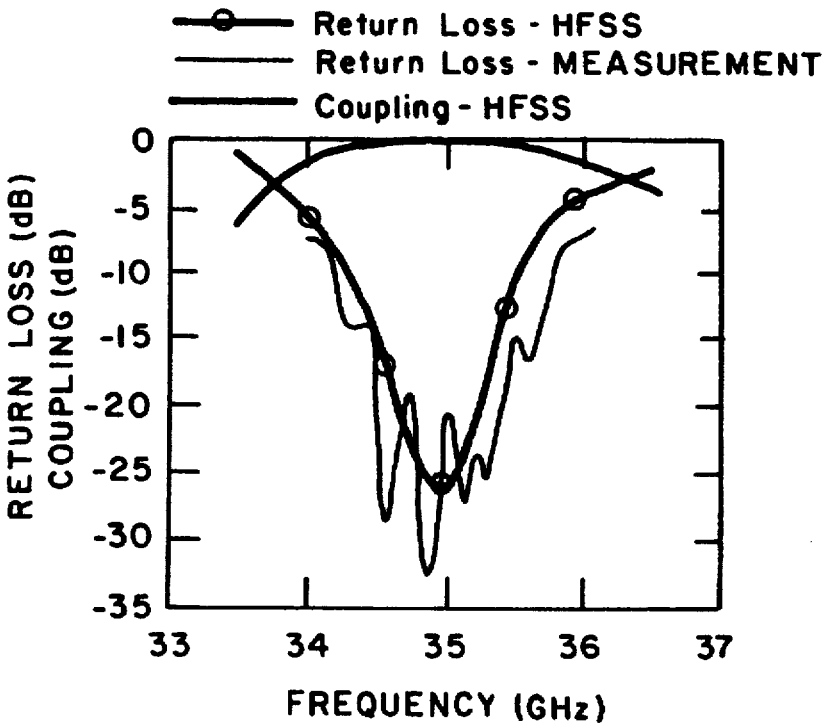
FIG. 15 is a plot of return loss versus coupling for various measured and ideal arrangements.

FIG. 14 shows back-to-back "identical" couplers 10A and 10B arranged to measure the coupling strength of the smooth guide structure. Coupling strength measurements are illustrated in FIG. 15. The measurements indicate a coupling coefficient of ≠–1 dB in good agreement with a simulation. The measured value of coupling coefficient by the back-to-back setup is divided by two to compare with HFSS. Return loss of the complete circuit was measured and a response close to that of the smooth guide coupler alone was observed.

The advantages of the coupler 10 for the slotted waveguide interaction structures of the invention is single-port excitation of the linearly polarized wave with wide bandwidth of more than 10%. Excellent coupling strength (—0.2 dB) and reasonably low return loss (—20 dB) are also among its advantages. The rectangular input waveguide 18 which is H-plane teed to ring-waveguide 14 provides a linearly polarized wave. Offsetting the ring waveguide 14 and providing large square holes 16 produces wider bandwidth. For higher power applications, magnetic coupling in the hybrid structure increases the electric breakdown threshold.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed is:

1. A coupler for a slotted waveguide interactive structure comprising:

a hybrid smooth-guide linearly polarized $TE_{3,1}$ coupler including a smooth-guide cylinder having a plurality of coupling holes formed therein and a ring waveguide surrounding the cylinder;

a linear tapered rectangular transition waveguide H-plane teed to the ring waveguide; and a nonlinearly tapered transition waveguide mode converter having a smooth-guide end coupled to the smooth-guide cylinder and a reduced diameter slotted guide end for mode conversion from the cylindrical mode to a slotted mode.

2. A coupler according to claim 1 wherein the coupling holes are square.

3. The coupler according to claim 1 wherein the ring waveguide is concentric with the cylinder.

4. The coupler according to claim 1 wherein the ring waveguide is offcenter with respect to the cylinder.

5. The waveguide according to claim 1 wherein the mode converter has a smooth-guide end having a diameter about twice the diameter of the slotted end.

6. The coupler according to claim 1 wherein the converter has an inner radius $R_{in}$ and an outer radius $R_o$.

7. The waveguide according to claim 1 wherein the inner radius is about one-half the outer radius.

8. The coupler according to claim 1 wherein the magnetic field associated with the coupler is in a range of about 0.632 and 0.663T.

9. The coupler of claim 1 wherein the magnetic field associated with the coupler is about 0.65 T.

10. The coupler according to claim 1 wherein the hole radii increase symmetrically with distance from the H-plane input tee.

11. The coupler according to claim 1 wherein the cylindrical waveguide has a first radius less than about 0.24".

12. A method for coupling millimeter waves between rectangular and slotted guides comprising the steps of:

transitioning from the rectangular guide to an annular guide via an H plane TEE;

transitioning from the annular guide to a concentric circular guide via circumferentially located intermediate apertures;

transitioning from the circular guide to the slotted guide via a tapered cylindrical member; and mode converting in the tapered cylindrical member via radial slots formed therein.

* * * * *